United States Patent
Borth et al.

(10) Patent No.: US 9,856,683 B1
(45) Date of Patent: Jan. 2, 2018

(54) DOOR HINGE

(71) Applicant: Honda Motor Co., Ltd., Tokyo (JP)

(72) Inventors: Jacob O Borth, Marysville, OH (US); Tsuyoshi Kumasaka, Tokyo (JP); Sebastian Osorio, Columbus, OH (US); Thomas Pollock, Fletcher, NC (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/383,161

(22) Filed: Dec. 19, 2016

(51) Int. Cl.
| | |
|---|---|
| *B60J 5/00* | (2006.01) |
| *E05D 7/06* | (2006.01) |
| *E05D 5/02* | (2006.01) |
| *B60J 5/04* | (2006.01) |

(52) U.S. Cl.
CPC ........ *E05D 7/06* (2013.01); *B60J 5/04* (2013.01); *E05D 5/0207* (2013.01); *B60Y 2410/124* (2013.01)

(58) Field of Classification Search
CPC ............. B60J 5/04; E05D 7/06; E05D 5/0207
USPC .... 296/146.1, 146.11, 146.12, 146.6, 190.11
See application file for complete search history.

(56) References Cited

U.S. PATENT DOCUMENTS

| | | | |
|---|---|---|---|
| 4,273,378 A | 6/1981 | Kramer | |
| 5,529,369 A * | 6/1996 | Welborn | ............... B60J 5/0487 280/DIG. 5 |
| 6,293,610 B1 | 9/2001 | Howard | |
| 6,808,038 B2 | 10/2004 | Schneider | |
| 6,942,277 B2 | 9/2005 | Rangnekar et al. | |
| 6,979,046 B2 | 12/2005 | Moriyama et al. | |
| 7,249,645 B2 | 7/2007 | Herrmann et al. | |
| 7,281,753 B2 | 10/2007 | Curtis et al. | |
| 7,455,137 B2 | 11/2008 | Magsaam | |
| 7,530,623 B2 * | 5/2009 | Hampel | ............... B62D 29/043 296/146.1 |
| 8,007,026 B2 | 8/2011 | Scott et al. | |
| 8,794,692 B1 | 8/2014 | Burke | |
| 8,998,289 B2 | 4/2015 | Peterson et al. | |
| 2014/0217767 A1 | 8/2014 | Heit et al. | |
| 2014/0292039 A1 * | 10/2014 | Kuroda | ................... B60R 21/13 296/203.01 |
| 2015/0014974 A1 | 1/2015 | Cotnoir et al. | |
| 2015/0259011 A1 | 9/2015 | Deckard et al. | |

FOREIGN PATENT DOCUMENTS

| | | |
|---|---|---|
| JP | 2007030706 A | 2/2007 |
| WO | WO2014193975 A1 | 12/2014 |

* cited by examiner

*Primary Examiner* — Joseph D Pape
(74) *Attorney, Agent, or Firm* — Honda Patents & Technologies North America, LLC; Mark E. Duell

(57) ABSTRACT

A frame for a motor vehicle is disclosed. The frame includes a longitudinal side member, an A-pillar extending upward from the longitudinal side member and defining a front of the cockpit, a B-pillar extending upwardly and rearwardly from the longitudinal side member rearward of the A-pillar and defining a rear of the cockpit, a door positioned between the A-pillar and the B-pillar, and a hinge assembly attached to the B-pillar. The hinge assembly includes an upright hinge pipe that extends vertically through the door to reinforce the door, the upright hinge pipe having a top end and a bottom end, an upper hinge pipe pivotally attached to the top end of upright hinge pipe and fixedly attached to the B-pillar, and a lower pivot connecting the bottom end of the upright hinge pipe to the B-pillar.

20 Claims, 7 Drawing Sheets

DOOR HINGE

TECHNICAL FIELD

The embodiments are directed toward a door hinge for a multi-utility vehicle (MUV) with a sloping B-pillar.

BACKGROUND

In prior multi-utility vehicles (MUV), the B-pillar would typically be oriented vertically in order to properly hang a door from the B-pillar. In order to provide additional design options, whether for effect or for practical reasons, such as avoiding the rear wheels of the MUV, an improved door hinge construction for a MUV with a rearward sloping B-pillar attachment became desirable that allows the door pivot to be relatively vertical while the B-pillar can be at an angle leaning to the rear of the vehicle.

APPLICATION SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

According to one aspect, a frame for a motor vehicle is disclosed. The motor vehicle includes at least one pair of wheels connected to the frame, a motor supported by the frame and operatively connected to the at least one of the pair of wheels, a cabin area in the frame, and a seat disposed in the cabin area. The frame includes a longitudinal side member, a first pillar extending upwardly from the longitudinal side member and defining a front of the cabin area, a second pillar extending upwardly and rearwardly from the longitudinal side member rearward of the first pillar and defining a rear of the cabin area, a door positioned between the first pillar and the second pillar, and a hinge assembly attached to the second pillar. The hinge assembly includes an upright hinge pipe that extends through the door to reinforce the door, the upright hinge pipe having a top end and a bottom end, an upper hinge pipe pivotally attached to the top end of the upright hinge pipe and fixedly attached to the second pillar, and a lower pivot connecting the bottom end of the upright hinge pipe to the frame.

According to another aspect, a motor vehicle includes a frame. The frame further includes a longitudinal side member, an A-pillar extending upward from the longitudinal side member and defining a front of the cockpit, and a B-pillar extending upwardly and rearwardly from the longitudinal side member rearward of the A-pillar and defining a rear of the cockpit. The motor vehicle further includes a door positioned between the A-pillar and the B-pillar, and a hinge assembly attached to the B-pillar. The hinge assembly includes an upright hinge pipe that extends through the door to reinforce the door, the upright hinge pipe having a top end and a bottom end, an upper hinge pipe pivotally attached to the top end of upright hinge pipe and fixedly attached to the B-pillar, and a lower pivot connecting the bottom end of the upright hinge pipe to the B-pillar.

According to yet another aspect, a hinge assembly for attaching a door to a sloped member includes an upright hinge pipe that extends through the door to reinforce the door, the upright hinge pipe having a top end and a bottom end, an upper hinge pipe pivotally attached to the top end of the upright hinge pipe and fixedly attached to the sloped member, and a lower pivot connecting the bottom end of the upright hinge pipe to the sloped member.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Figure 1:
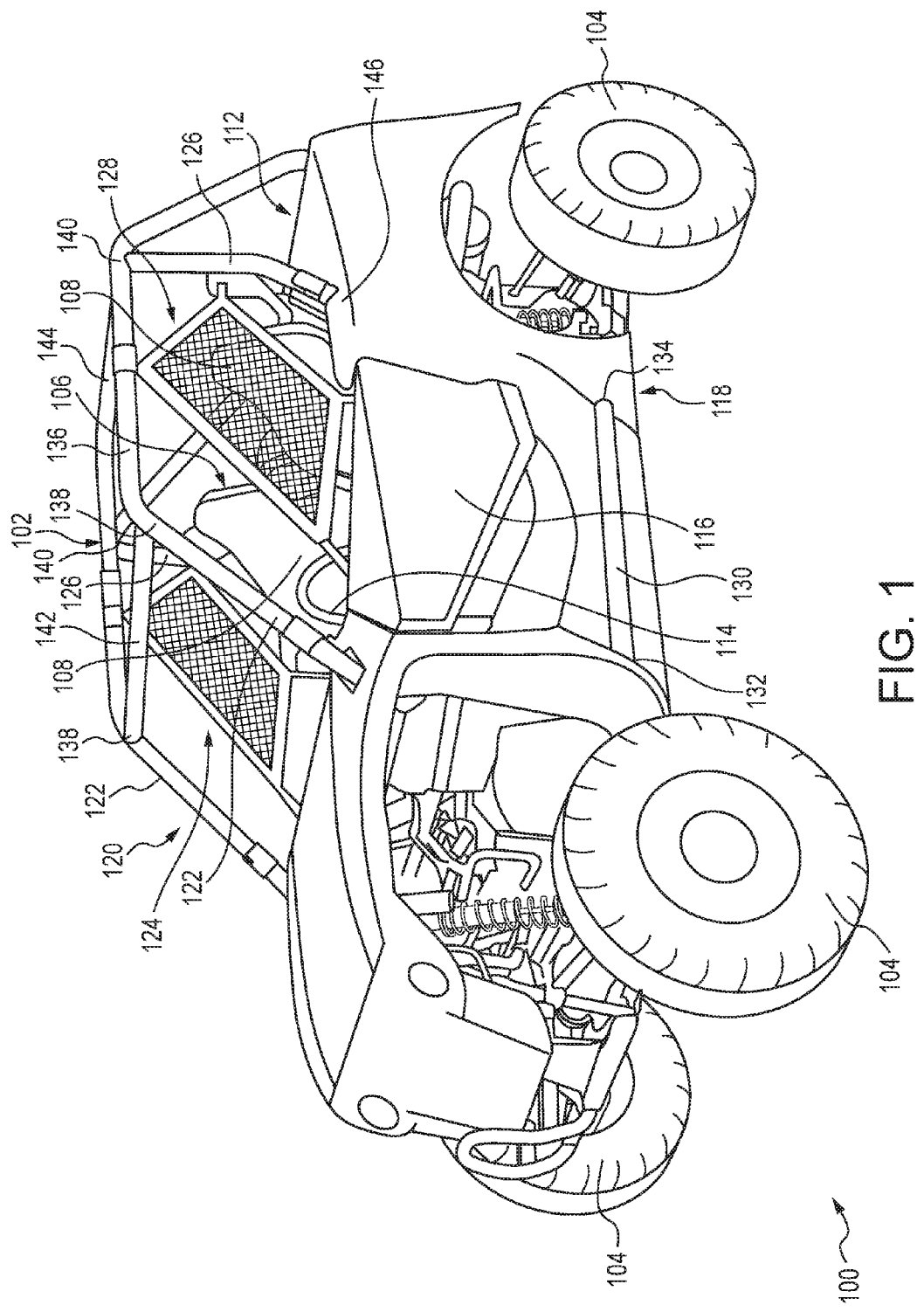
FIG. 1 is a side perspective view of a motor vehicle.

FIG. 1 illustrates one embodiment of a motor vehicle 100. The motor vehicle 100 illustrated is a typical multi-utility vehicle, or MUV, which includes a frame 102, wheels 104 attached to the frame 102, a cabin area 106 in the frame 102, which includes seats 108, an engine assembly (not shown) located in the rear of the motor vehicle 100 and attached to the frame 102 for driving the wheels 104, and a rear end area 112.

Figure 2:
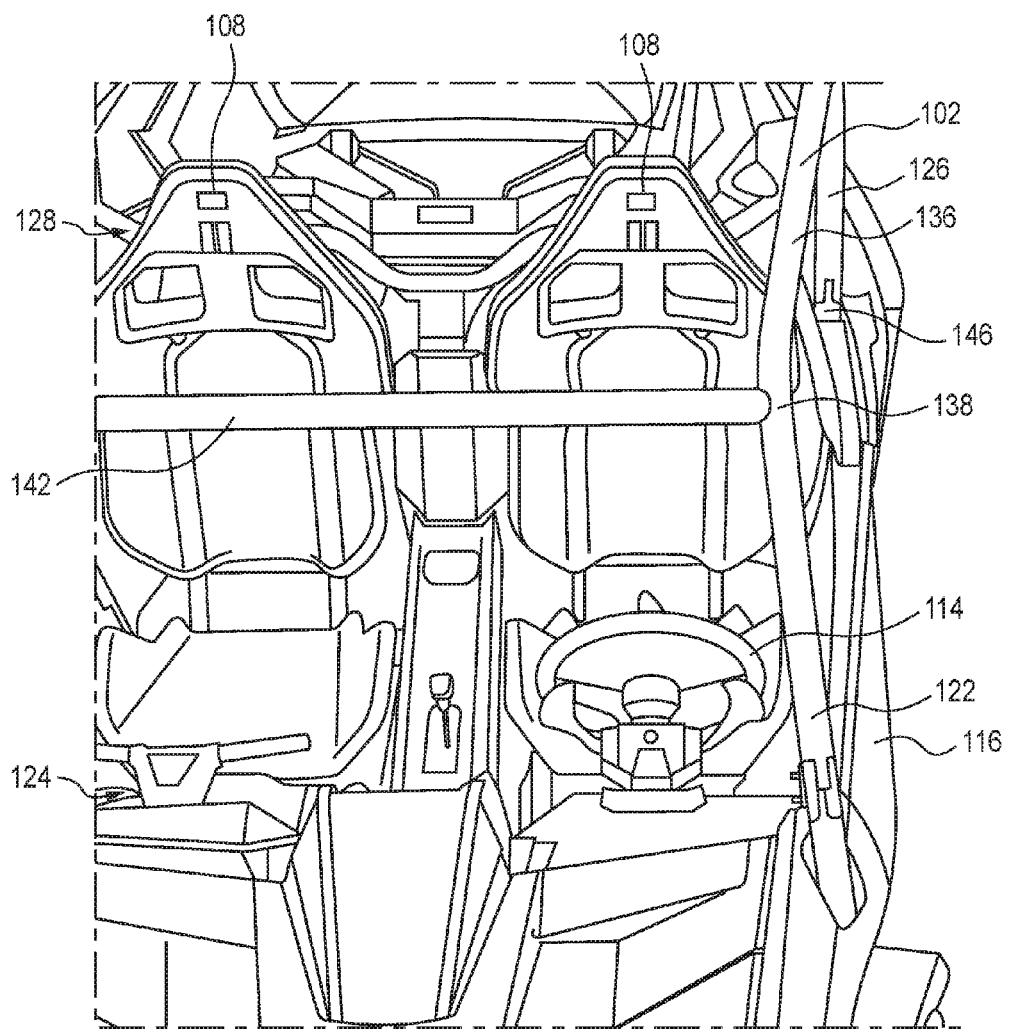
FIG. 2 is a top view of a portion of the motor vehicle of FIG. 1.

With continuing reference to FIGS. 1-2, the components of the frame 102 will be discussed. The left and right sides 118, 120 are mirror image constructions, and the frame 102 will be discussed with reference to the left side 118, and the right side 120 has as identical construction. Each of the left and right sides 118, 120 of the frame 102 includes an A-pillar 122 that defines the forward boundary 124 of the cabin area 106 and a B-pillar 126 that defines the rearward boundary 128 of the cabin area 106. A side sill 130 extends between the bottom 132 of the A-pillar 122 and the bottom 134 of the B-pillar 126, and a lateral roof member 136 extends between the top 138 of the A-pillar 122 and the top 140 of the B-pillar 126. A forward cross member 142 extends between the tops 138 of the A-pillars 122 for each of the left side 118 and right side 120. A rearward cross member 144 extends between the tops 140 of the B-pillars 126. In order to maximize the space of the cabin area 106, the B-pillars 126 extend upward and rearward at an angle. This is necessary because the B-pillars 126 may not interfere with rearward wheels 104.

Figure 3:
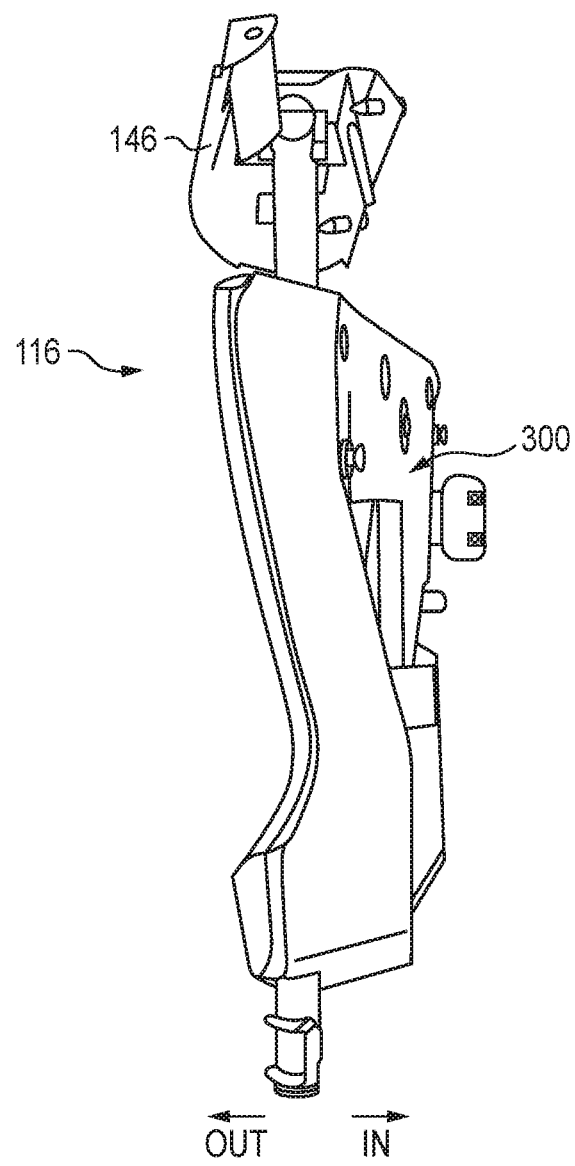
FIG. 3 is a rear view of a door of the motor vehicle of FIG. 1.

FIG. 2 illustrates a top view of the embodiment of the motor vehicle illustrated in FIG. 1, particularly the cabin area 106. As seen in FIGS. 1 and 2, the cabin area 106 includes a steering wheel 114 for controlling the wheels 104, and a door 116 for closing the cabin area 106. The door 116, a rear view of which is illustrated in FIG. 3, includes an outward oriented bulge 300. The bulge 300 provides additional room around the upper torso and shoulders of the driver and passenger. The door 116 may be constructed of any suitable lightweight material such as plastic, carbon fiber, fiberglass, or the like.

Due to the rearward and upward slope of each of the B-pillars 126, there is a need for an improved hinge structure 146 for each door 116. The hinge structure 146 will be discussed with reference to the structure on the left side 118 of the motor vehicle 100. The hinge structure 146 on the right side 120 of the motor vehicle 100 is identical.

Figure 4:
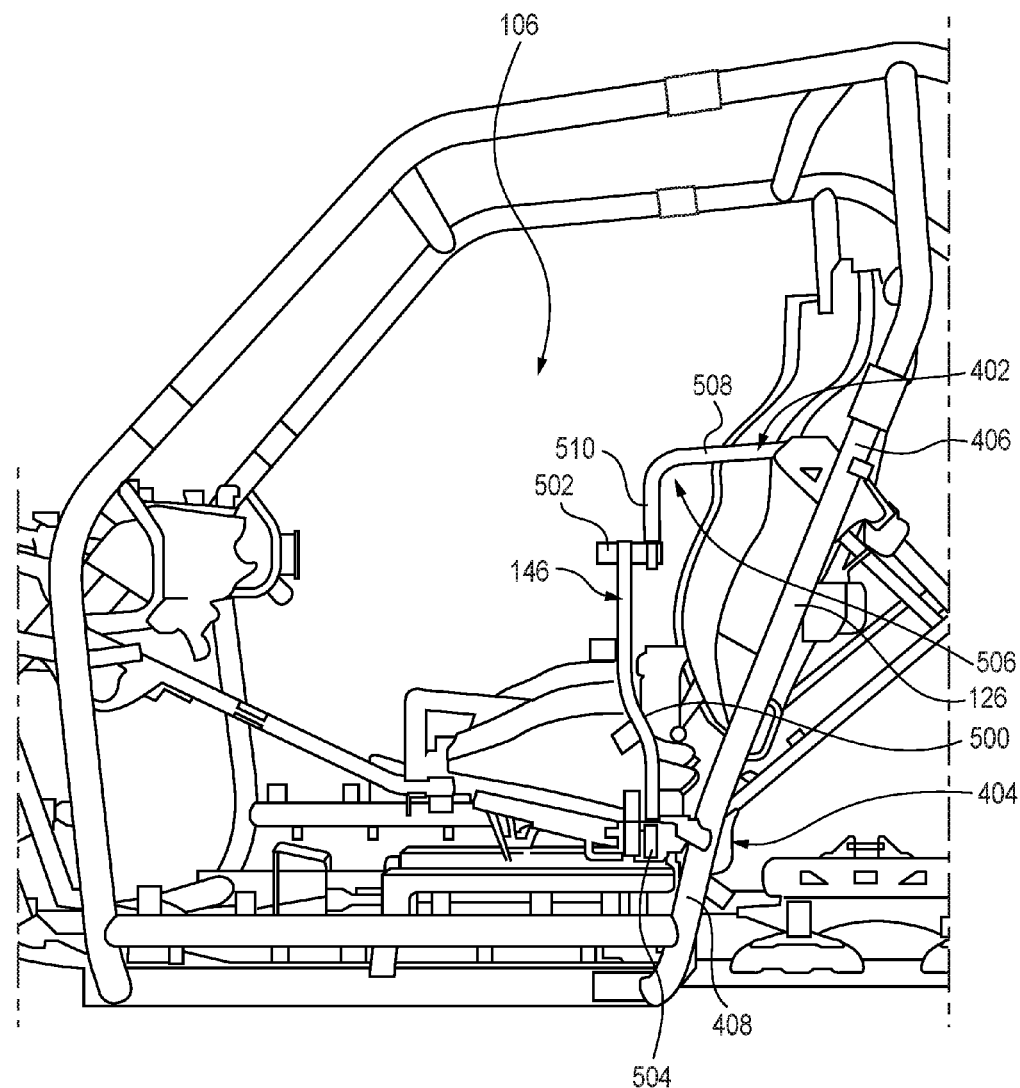
FIG. 4 is a side view of the cabin area of the motor vehicle of FIG. 1.
Figure 5:
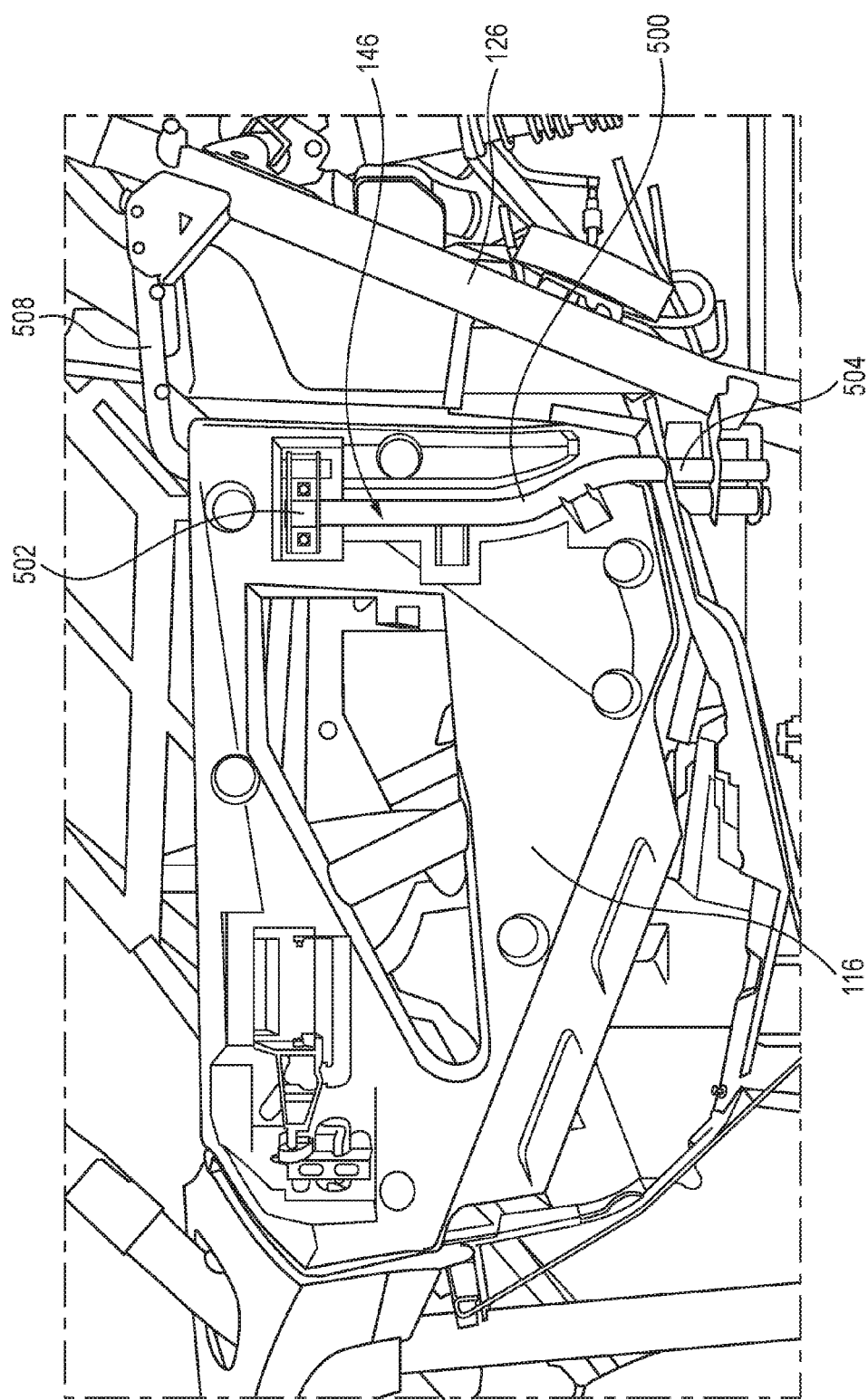
FIG. 5 is a side view of the cabin area of FIG. 4 with the door attached without an outer door panel.
Figure 6:
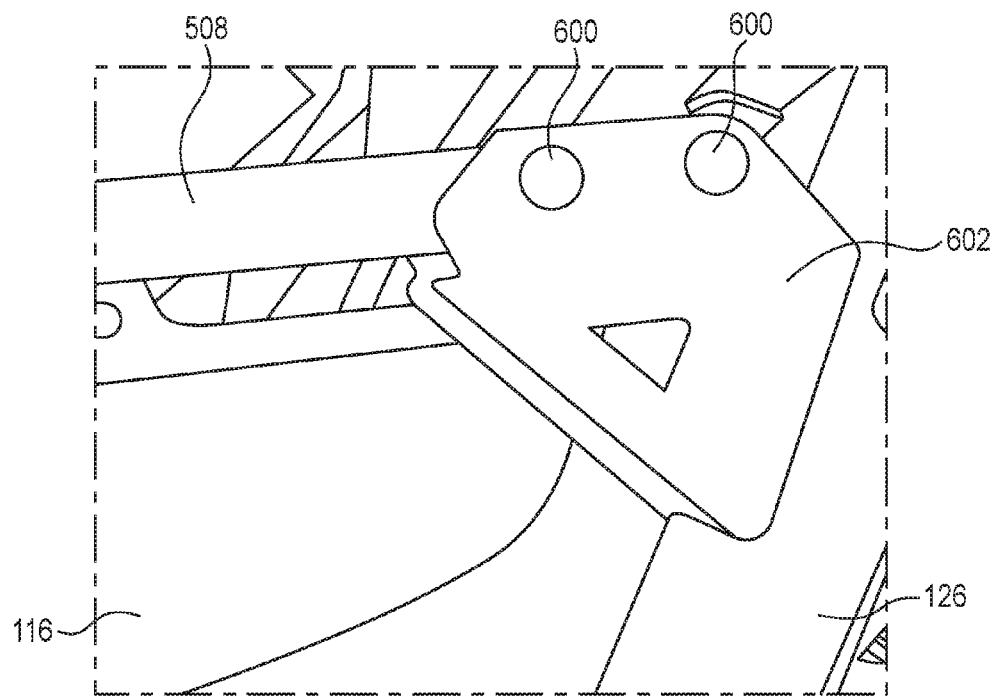
FIG. 6 is a side view of a bracket attaching a hinge to the B-pillar of the motor vehicle of FIG. 1.

With reference to FIGS. 4-8, the hinge structure 146 for attaching the door 116 to the B-pillar 126 is discussed. FIG. 4 illustrates a side view of the cabin area 106 without the door 116. The hinge structure 146 includes an upper hinge 402 attached to the B-pillar 126 in a center location 406, and a lower hinge 404 attached to the B-pillar 126 in a lower location 408. As illustrated in FIG. 5, a generally upright hinge pipe 500 in the hinge structure 146 is integrated into the door 116. The top 502 of the hinge pipe 500 is rotationally attached to the upper hinge 402, and the bottom 504 of the hinge pipe 500 is rotationally attached to the lower hinge 404. The hinge pipe 500, as illustrated in FIG. 5, is curvilinear, which may help to add structural support to the door 116. However, additional embodiments may employ a linear hinge pipe 500.

The upper hinge 402 includes an upper hinge pipe 506 that is generally L-shaped with a longer upper arm 508 that is generally oriented horizontally, and shorter lower arm 510 that is generally oriented vertically. The upper arm 508 is fixedly attached to the B-pillar 126. In the embodiment illustrated in FIG. 6, the upper arm 508 is attached to B-pillar 126 by weld nuts and bolts 600 to a bracket 602, which is in turn fixedly attached to the B-pillar 126 by means of welding. Alternate methods of fixedly attaching the upper arm 508 to the B-pillar 126 may be applied as deemed appropriate by one skilled in the art. The length of the upper arm 508 may be adjusted based upon the rearward slope of the B-pillar 126. The greater the slope rearward, the longer the upper arm 508 may be to ensure that the door 116 has a vertical hinge 146 about which it may rotationally pivot.

Figure 7:
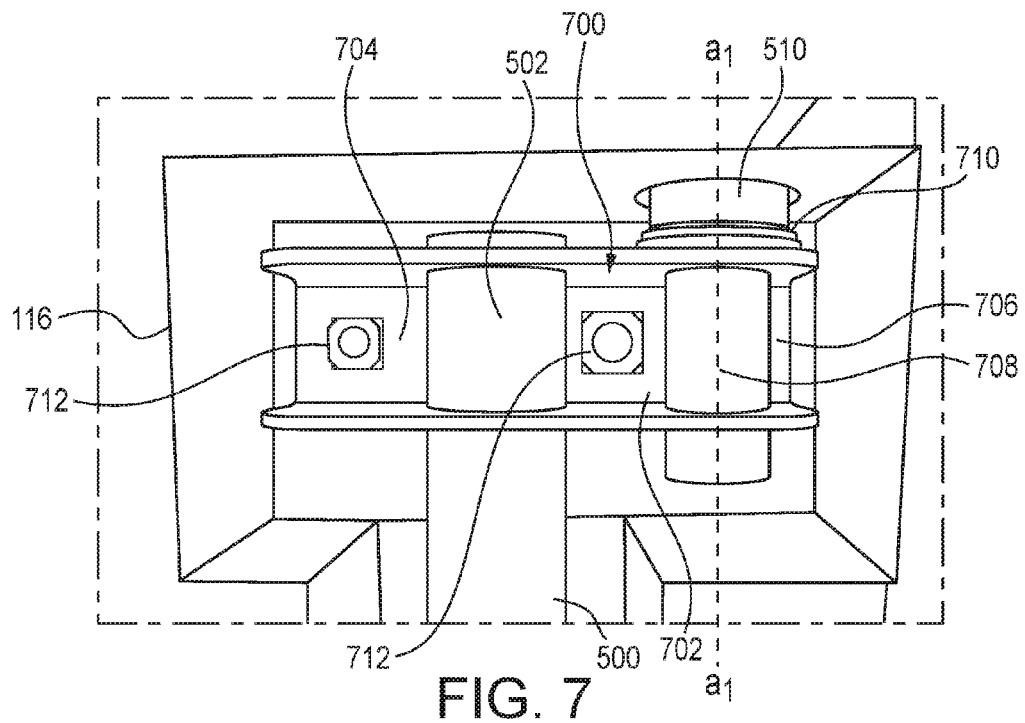
FIG. 7 is a side view of a bracket attaching the door to the hinge of the motor vehicle of FIG. 1.

The lower arm 510 of the upper hinge pipe 506 is pivotally attached to a bracket 700 at the top 502 of the hinge pipe 500, as illustrated further in FIG. 7. The bracket 700 is fixed to the top 502 of the hinge pipe 500. The bracket includes two flat surfaces 702, 704 for attachment to the door 116 by weld nuts and bolts 712, as illustrated in FIG. 7, or by any other suitable method known to those skilled in the art, including, but not limited to, nuts and bolts, rivets, screws, welding, or adhesives. At the distal end 706 of the first flat surface 702 there is a round receiver 708 for receiving the lower arm 510 of the upper hinge pipe 506. There is a joint 710 in the receiver 708 providing a pivotal attachment of the lower arm 510 of the upper hinge pipe 506 and the bracket 700, the lower arm 510 of the upper hinge 506 rotating about a vertical axis a1 through the center of the lower arm 510 and the receiver 708. The pivotal connection of the lower arm 510 of the upper hinge pipe 506 and the hinge pipe 500 allows the door 116 to open and close by pivoting around axis a1.

Figure 8:
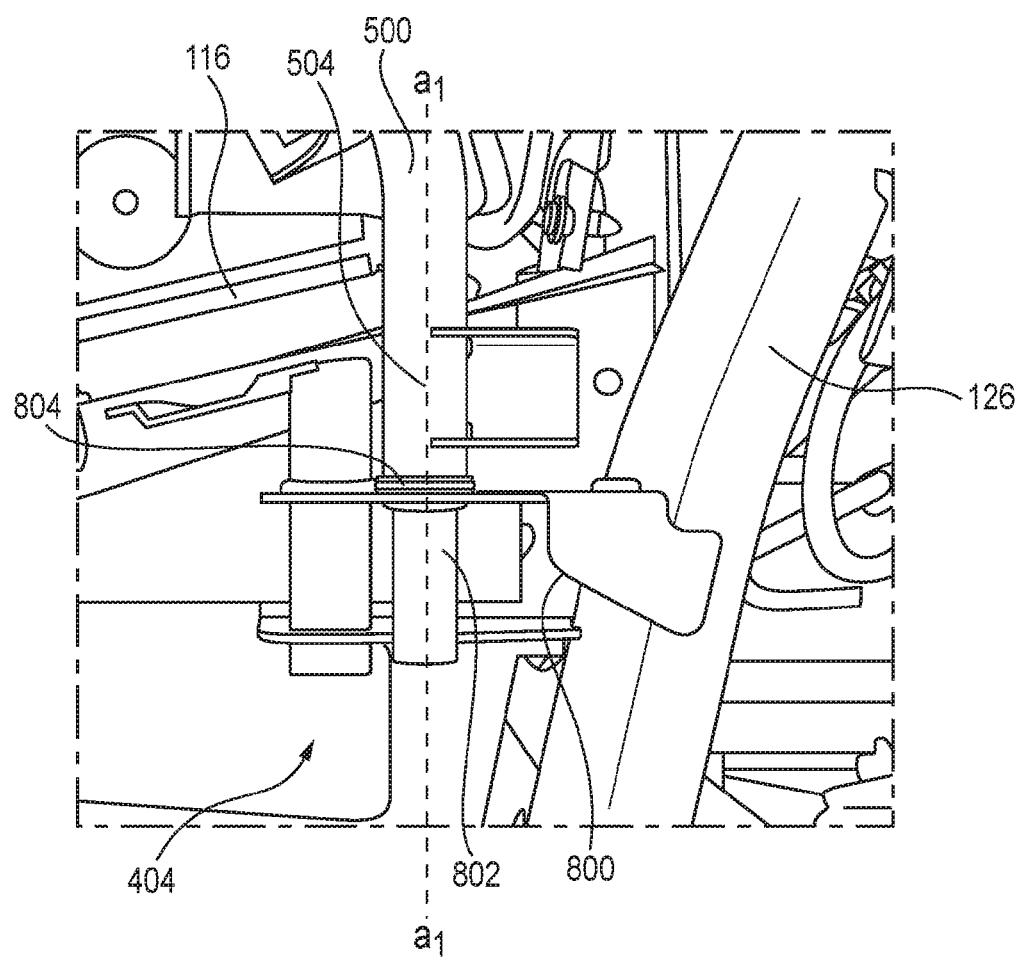
FIG. 8 is a side view of a lower bracket attaching a lower door hinge to the B-pillar of the motor vehicle of FIG. 1.

FIG. 8 shows the lower hinge 404 in greater detail. The lower hinge 404 includes a lower bracket 800 fixedly attached to the B-pillar. The lower bracket 800 may be attached by welding, rivets, weld nuts and bolts, or any other suitable method known to those skilled in the art. The lower bracket 800 further includes a lower receiver 802 for receiving the bottom 504 of the hinge pipe 500. The lower receiver 802 includes a joint 804 providing a pivotal attachment of the hinge pipe 500 and the lower bracket 800. The hinge pipe 500 also rotates about vertical axis a1, which runs through the center of the lower arm 510 and the receiver 708 of the upper hinge 402, the bottom 504 of the hinge pipe 500, and the lower receiver 802 of the lower hinge 404.

The embodiments discussed herein and illustrated in FIGS. 1-8 have been related to a MUV as the motor vehicle 100. The hinge structure 146 disclosed herein need not be limited to a motor vehicle 100, but may be applied to any door 116 for an opening that is attached to a sloped member, such as the B-pillar 126 of the motor vehicle 100.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A frame for a motor vehicle, the motor vehicle comprising at least one pair of wheels connected to the frame, a motor supported by the frame and operatively connected to the at least one of the pair of wheels, a cabin area in the frame, and a seat disposed in the cabin area, the frame comprising:
    a longitudinal side member;
    a first pillar extending upwardly from the longitudinal side member and defining a front of the cabin area;
    a second pillar extending upwardly and rearwardly from the longitudinal side member rearward of the first pillar and defining a rear of the cabin area;
    a door positioned between the first pillar and the second pillar; and
    a hinge assembly attached to the second pillar, comprising:
        an upright hinge pipe that extends through the door to reinforce the door, the upright hinge pipe having a top end and a bottom end;
        an upper hinge pipe pivotally attached to the top end of the upright hinge pipe and fixedly attached to the second pillar; and
        a lower pivot connecting the bottom end of the upright hinge pipe to the frame.

2. The frame for a motor vehicle of claim 1 wherein the upper hinge pipe is generally L-shaped with a generally horizontal first portion having a first end fixedly attached to the second pillar and a generally vertical second portion having a second end pivotally attached to the top end of upright hinge pipe.

3. The frame for a motor vehicle of claim 2 wherein the top end of the upright hinge pipe comprises:
    a base integrally extending from the upright hinge pipe, the base being attached to the door; and an upper pivot pipe formed integrally with the base for pivotally receiving the second end of the upper hinge pipe.

4. The frame for a motor vehicle of claim 3 wherein the lower pivot comprises:
a bracket welded to the frame, the bottom end of the upright hinge pipe rotatably connected to the bracket.

5. The frame for a motor vehicle of claim 4 wherein the lower pivot is attached to the second pillar.

6. The frame for a motor vehicle of claim 4 wherein the lower pivot is attached to the longitudinal side member.

7. The frame of the motor vehicle of claim 1 wherein the upright hinge pipe is curvilinear.

8. A motor vehicle comprising:
a frame, the frame further comprising:
a longitudinal side member;
an A-pillar extending upward from the longitudinal side member and defining a front of the cockpit; and
a B-pillar extending upwardly and rearwardly from the longitudinal side member rearward of the A-pillar and defining a rear of the cockpit;
a door positioned between the A-pillar and the B-pillar; and
a hinge assembly attached to the B-pillar, comprising:
an upright hinge pipe that extends through the door to reinforce the door, the upright hinge pipe having a top end and a bottom end;
an upper hinge pipe pivotally attached to the top end of the upright hinge pipe and fixedly attached to the B-pillar; and
a lower pivot connecting the bottom end of the upright hinge pipe to the B-pillar.

9. The motor vehicle of claim 8 wherein the upper hinge pipe is generally L-shaped with a generally horizontal first portion having a first end fixedly attached to the B-pillar and a generally vertical second portion having a second end pivotally attached to the top end of upright hinge pipe.

10. The motor vehicle of claim 9 wherein the top end of the upright hinge pipe comprises:
a base integrally extending from the upright hinge pipe, the base being attached to the door; and
an upper pivot pipe formed integrally with the base for pivotally receiving the second end of the upper hinge pipe.

11. The motor vehicle of claim 10 wherein the lower pivot is welded to the B-pillar.

12. The motor vehicle of claim 11 wherein the lower pivot comprises:
a bracket welded to the B-pillar, the bottom end of the upright hinge pipe rotatably connected to the bracket.

13. The motor vehicle of claim 10 wherein the upright hinge pipe is curvilinear.

14. A hinge assembly for attaching a door to a sloped member, comprising:
an upright hinge pipe that extends through the door to reinforce the door, the upright hinge pipe having a top end and a bottom end;
an upper hinge pipe pivotally attached to the top end of the upright hinge pipe and fixedly attached to the sloped member; and
a lower pivot connecting the bottom end of the upright hinge pipe to the sloped member.

15. The hinge assembly of claim 14 wherein the upper hinge pipe is generally L-shaped with a generally horizontal first portion having a first end fixedly attached to the sloped member and a generally vertical second portion having a second end pivotally attached to the top end of upright hinge pipe.

16. The hinge assembly of claim 15 wherein the top end of the upright hinge pipe comprises:
a base integrally extending from the upright hinge pipe, the base being attached to the door; and
an upper pivot pipe formed integrally with the base for pivotally receiving the second end of the upper hinge pipe.

17. The hinge assembly of claim 16 wherein the lower pivot comprises:
a bracket attached to the sloped member, the bottom end of the upright hinge pipe rotatably connected to the bracket.

18. The hinge assembly of claim 17 wherein the lower pivot is welded to the sloped member.

19. The hinge assembly of claim 17 wherein the lower pivot is welded to a longitudinal side member fixedly attached to a bottom of the sloped member.

20. The hinge assembly of claim 16 wherein the upright hinge pipe is curvilinear.

* * * * *